(12) United States Patent
Heinen et al.

(10) Patent No.: US 11,970,347 B2
(45) Date of Patent: Apr. 30, 2024

(54) CLEAN PNEUMATIC CONVEYING SHIELD, MOLD REPLACEMENT SYSTEM FOR EXPANDING MACHINE AND REPLACEMENT METHOD

(71) Applicant: Famsun Co., Ltd, Jiangsu (CN)

(72) Inventors: Russell Alan Heinen, Jiangsu (CN); Robert Strathman, Jiangsu (CN); Bo Chen, Jiangsu (CN)

(73) Assignee: FAMSUN CO., LTD., Jiangsu (CN)

( * ) Notice: Subject to any disclaimer, the term of this patent is extended or adjusted under 35 U.S.C. 154(b) by 141 days.

(21) Appl. No.: 17/638,288

(22) PCT Filed: Nov. 12, 2020

(86) PCT No.: PCT/CN2020/128322
§ 371 (c)(1),
(2) Date: Feb. 25, 2022

(87) PCT Pub. No.: WO2021/164336
PCT Pub. Date: Aug. 26, 2021

(65) Prior Publication Data
US 2022/0297955 A1 Sep. 22, 2022

(30) Foreign Application Priority Data
Feb. 18, 2020 (CN) .......................... 202010099374.9

(51) Int. Cl.
*B65G 53/34* (2006.01)
*B29C 33/74* (2006.01)

(52) U.S. Cl.
CPC .............. *B65G 53/34* (2013.01); *B29C 33/74* (2013.01)

(58) Field of Classification Search
None
See application file for complete search history.

(56) References Cited

U.S. PATENT DOCUMENTS 4,442,865 A    4/1984  Shigeo
5,054,965 A *  10/1991 Clark .................... B65G 53/24
                                              406/151

(Continued)

FOREIGN PATENT DOCUMENTS

CN    202642841 U    1/2013
CN    204896814 U    12/2015

(Continued)

OTHER PUBLICATIONS

International Search Report of PCT/CN2020/128322, dated Feb. 10, 2021.

*Primary Examiner* — William R Harp
(74) *Attorney, Agent, or Firm* — Locke Lord LLP; Tim Tingkang Xia, Esq.

(57) ABSTRACT

A clean pneumatic conveying shield includes a shield body used for picking up an expanded material from an expanded material discharge port and pneumatically conveying the expanded material to the next process and provided with a hollow closed inner cavity, an outlet pipeline positioned in the middle of the top of the shield body and communicated with the inner cavity of the shield, and at least 2 inlet pipelines positioned at the top of the shield body, arranged around the outlet pipeline and communicated with the inner cavity of the shield. The shield body is provided with a splitter plate corresponding to each inlet pipeline and capable of rotating, an upper partition plate positioned above each splitter plate and a lower partition plate positioned below each splitter plate.

8 Claims, 31 Drawing Sheets

(56) References Cited

U.S. PATENT DOCUMENTS

| | | | | |
|---|---|---|---|---|
| 5,505,567 | A | * | 4/1996 | Scott ...................... A21C 11/16 406/106 |
| 10,112,333 | B2 | * | 10/2018 | Thorn ..................... B29C 48/04 |
| 2016/0304295 | A1 | | 10/2016 | Thorn et al. |

FOREIGN PATENT DOCUMENTS

| | | |
|---|---|---|
| CN | 108438909 A | 8/2018 |
| CN | 208868670 U | 5/2019 |
| CN | 111319985 A | 6/2020 |

\* cited by examiner

CLEAN PNEUMATIC CONVEYING SHIELD, MOLD REPLACEMENT SYSTEM FOR EXPANDING MACHINE AND REPLACEMENT METHOD

CROSS-REFERENCE TO RELATED APPLICATIONS

This application is a national stage entry of PCT Patent Application No. PCT/CN2020/128322, filed Nov. 12, 2020, which itself claims priority to Chinese Patent Application No. CN202010099374.9, filed Feb. 18, 2020, which are hereby incorporated herein in their entireties by reference.

TECHNICAL FIELD

The present invention relates to a pneumatic conveying shield, in particular to a clean pneumatic conveying shield, a mold replacement system for an expanding machine and a replacement method.

BACKGROUND

The pneumatic conveying shield of the expanding machine is a device for picking up an expanded product in the expanding machine and conveying the expanded product to a pneumatic conveying system, wherein the pneumatic conveying system can convey the product to the next process through air, pipelines and a separation device. Conventional pneumatic conveying shields draw untreated air at the original mounting position into a pipeline, typically from the ground. In recent years, the design trend has led to the introduction of positive pressure air into closed-loop pipeline systems and the recycling of heated air from the systems to avoid microbial contamination of products.

The prior art has developed the further design to allow easier access to the interior of the shield for cleaning and maintenance, while improving airflow inside the shield; the integrated design of a reversing plate and a discharging device facilitates the replacement and control of formulas. Both the expanding machine and pneumatic conveying suppliers can provide different pneumatic conveying shields of the expanding machine and pneumatic conveying systems. Among these pneumatic conveying systems, some provide air filtered by a high-efficiency particulate air filter, some provide heated air, and even some provide both to reduce the likelihood of contamination of the systems. Among existing shields, some provide a more convenient cleaning approach, and some provide a better maintenance approach; but many shields of the same type are easy to leak materials, have more flange connections and are difficult to mount, and the connection between the expanding machine and the motor is rigid.

Therefore, it is desirable to solve the above problems.

SUMMARY

Objective: A first objective of the present invention is to provide a clean pneumatic conveying shield with reduced leakage and contamination and a surface more favorable to sealing.

A second objective of the present invention is to provide a mold replacement system for an expanding machine based on the clean pneumatic conveying shield.

A third objective of the present invention is to provide a replacement method for the mold replacement system for the expanding machine.

Technical solution: In order to achieve the above objectives, the present invention discloses a clean pneumatic conveying shield, comprising: a shield body used for picking up an expanded material from an expanded material discharge port and pneumatically conveying the expanded material to the next process and provided with a hollow closed inner cavity, an outlet pipeline positioned in the middle of the top of the shield body and communicated with the inner cavity of the shield, and at least 2 inlet pipelines positioned at the top of the shield body, arranged around the outlet pipeline and communicated with the inner cavity of the shield, wherein the shield body is provided with a splitter plate corresponding to each inlet pipeline and capable of rotating, an upper partition plate positioned above each splitter plate and a lower partition plate positioned below each splitter plate; when each splitter plate is rotated to be connected with the upper partition plate and the lower partition plate corresponding thereto, a conveying airflow channel communicated with the inlet pipelines and the outlet pipeline and capable of carrying and conveying the expanded material through the expanded material discharge port is formed in the shield body in a dividing manner; when each splitter plate is rotated until all the splitter plates are intersected, a short-circuit airflow channel communicated with the inlet pipelines and the outlet pipeline and bypassing the expanded material discharge port is formed in the shield body in a dividing manner.

A discharge opening is formed at the bottom of the shield body, and discharge doors capable of being opened and closed relatively are symmetrically arranged on the discharge opening.

Preferably, an arc-shaped partition plate is arranged at the lower part of the inner cavity of the shield body.

Moreover, a top hinged access door and a bottom hinged access door are arranged on one side surface of the shield body facing an expanding machine, and a hinged template access door is arranged on one side surface of the shield body facing a motor.

Furthermore, rotatory executive components capable of driving the splitter plates to rotate are connected to the splitter plates, and each rotatory executive component comprises a swing cylinder, a splitter plate rotation shaft connecting with an output shaft of the swing cylinder through a coupling, a mounting bracket fixing to the shield body through a bearing and used for fixing the swing cylinder, and magnetic switches positioned on the swing cylinder and used for changing a rotation angle of the swing cylinder.

Moreover, a spring reset type sampling door is arranged on one side surface of the shield body facing a motor, and the spring reset type sampling door comprises a front door, a top plate, two side plates used for connecting the front door and the top plate, a handle positioned on the front door, a spring reset hinge positioned on the front door and the shield body, and an arc plate positioned in a space surrounded by the front door, the top plate and the side plates.

Preferably, the shield body is connected with an expanding machine through a clamping hoop sealing component, an expanded material discharge port is positioned in the shield body, and the shield body is connected with a motor through an adjustable sealing component.

Furthermore, the adjustable sealing component comprises connecting pipes of different diameters connecting with the shield body and the motor respectively and telescoping each other, and two ends of the outer walls of the two connecting pipes are fixed through a pull ring type clamping hoop and a pull ring type quick clamping hoop respectively.

Provided is a mold replacement system for an expanding machine based on the clean pneumatic conveying shield, which comprises: an overall support, motor sliding frames connected with the overall support through sliding rails, and a motor suspension bracket fixedly connected with the motor sliding frames and used for placing and fixing the motor.

Provided is a replacement method for the mold replacement system for the expanding machine, which comprises: opening the pull ring type clamping hoop and the pull ring type quick clamping hoop, driving the motor to slide in a direction away from a template through the sliding rails, the motor sliding frames and the motor suspension bracket, and then opening a hinged template access door; and inserting two guide rails into reserved screw holes of the template, dismounting screws for fixing the template, sliding the template and a blade set out of the shield body along the guide rails, and replacing the template with a new template and mounting the new template into the original position when the template is positioned outside the shield body.

Beneficial effects: The present invention has the following remarkable advantages compared with the prior art:

(1) The outer surface of the shield body is a smooth plane, only three access doors and the discharge opening at the bottom are positioned on the surface, and compared with a split shield in the prior art, the shield body is more favorable to sealing; the design of the integrated shield body disclosed herein greatly reduces the number of connecting points on a sealing surface, thereby reducing leakage and contamination, and the shield body provided with access doors can be conveniently and quickly cleaned, replaced with a template and maintained.

(2) The 2 inlet pipelines disclosed herein introduce the treated air from the two sides of the shield body and converge at the bottom of the shield to form an airflow, the airflow then flows upwards through an expanded material discharge port, and then an expanded material enters the airflow to be mixed with the air; two airflows in the shield body are converged at the bottom of the shield, which allows two air inlets to be converted into a single air outlet.

(3) The splitter plates disclosed herein can change internal airflow channels to split airflows, which can reduce the connections required by an independent steering valve, and meanwhile, access doors can be provided for dismounting module and blades; moreover, when the splitter plates are rotated to form a short-circuit airflow channel, the discharge doors at the bottom of the shield body can be opened at the same time, which allows the shield to be converted into a feeding mode, the airflow forms a short circuit and directly bypasses the expanded material discharge port, and meanwhile, the process of directly discharging the material below is realized. That is to say, when an operator needs to make the material bypass and leave the next process, the splitter plates can change the internal cavity channels to make the airflow form a short circuit and directly flow away from the upper part of the shield by bypassing the expanded material discharge port, and the discharge plate at the bottom is opened in the "feeding" mode to make the expanded material directly discharged into the pipeline at the lower part from the bottom of the shield by gravity.

(4) The adjustable quick clamping hoops are used on the motor side and the expanding machine side of the shield to realize quick butting and sealing connection; this design can ensure that the shield can be connected with expanding machines with different models and different designs; the quick clamping hoop connection can be adjusted to adapt to expanding machines and motors with different sizes, and meanwhile, the sealing of particle sealing grade is provided between interfaces of devices.

(5) The spring reset type sampling door disclosed herein can finish sampling when the system runs, the sampling door is pushed to the interior of the shield during sampling, and the arc plate is designed to guide a small part of products to the exterior of the shield and enter a sample cup of an operator for quality detection; the door can be quickly closed along with the release of a spring in the spring reset hinge, so that the machine downtime and the leakage of a large amount of products are avoided; the spring set type sampling door enables the operator to conveniently touch products during operation for detection as required instead of adopting a conventional method to discharge the materials to the ground and then sample the materials. As a result, the loss of products and the required cleaning work can be greatly reduced.

(6) Due to the narrow thickness of the shield main body and the large door on one side of the motor, the expanding mold can be replaced under the condition that the connection among the shield, the air inlets, the pneumatic conveying pipelines and the expanding machine is not cut off, and the motor and the shield are quickly and easily disconnected due to the design of the adjustable sealing component, and meanwhile, the mold replacement system for the expanding machine can move an motor driving device assembly out of the area so as to be completely maintained; when the template is replaced, the connection between the expanded pneumatic conveying cover and the expanding machine or the pipelines does not need to be cut off, and the template can be replaced only through the access door on the motor side.

DETAILED DESCRIPTION

Figure 1:
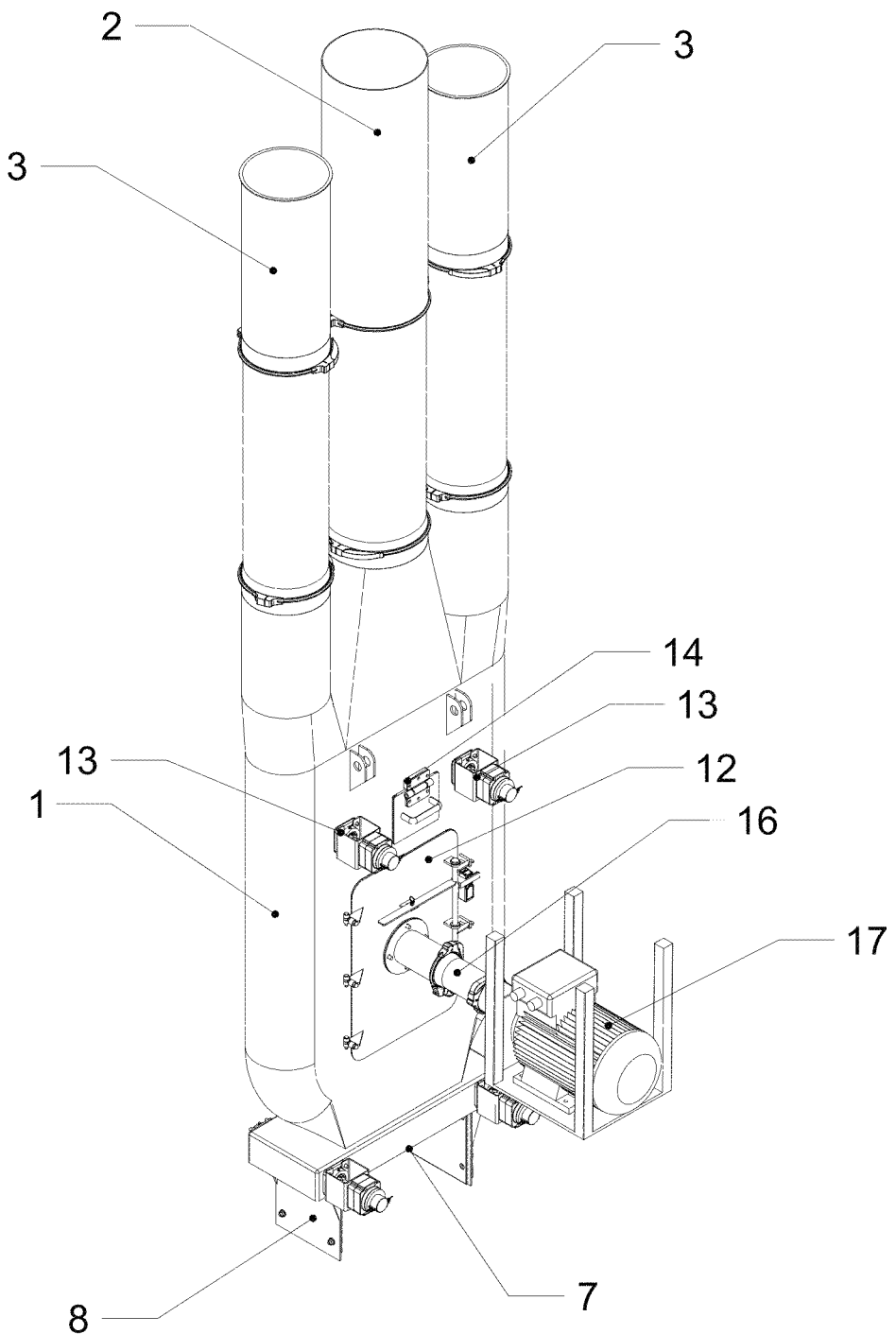
FIG. 1 is a schematic diagram I of the structure according to the present invention.
Figure 2:
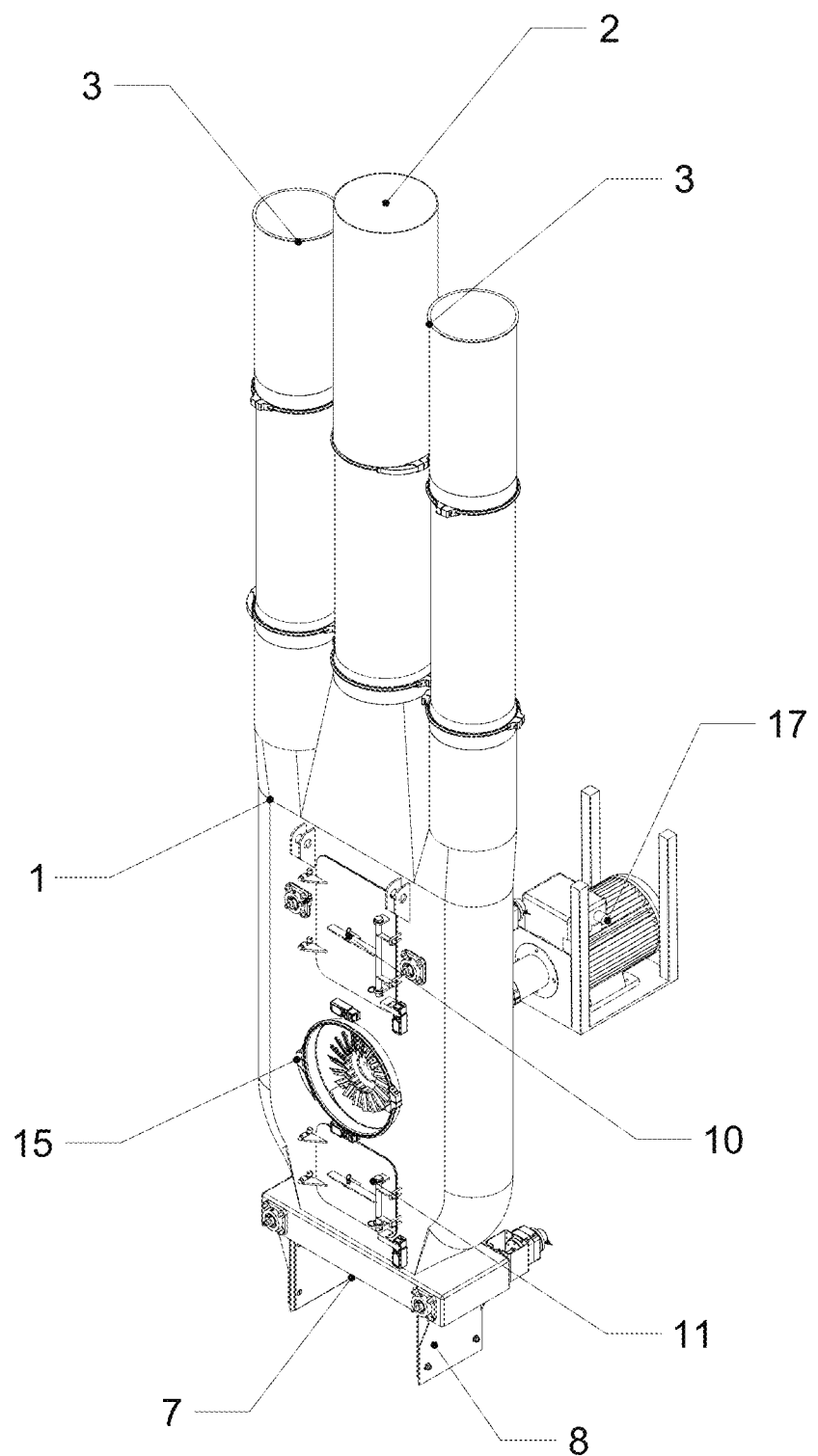
FIG. 2 is a schematic diagram II of the structure according to the present invention.
Figure 3:
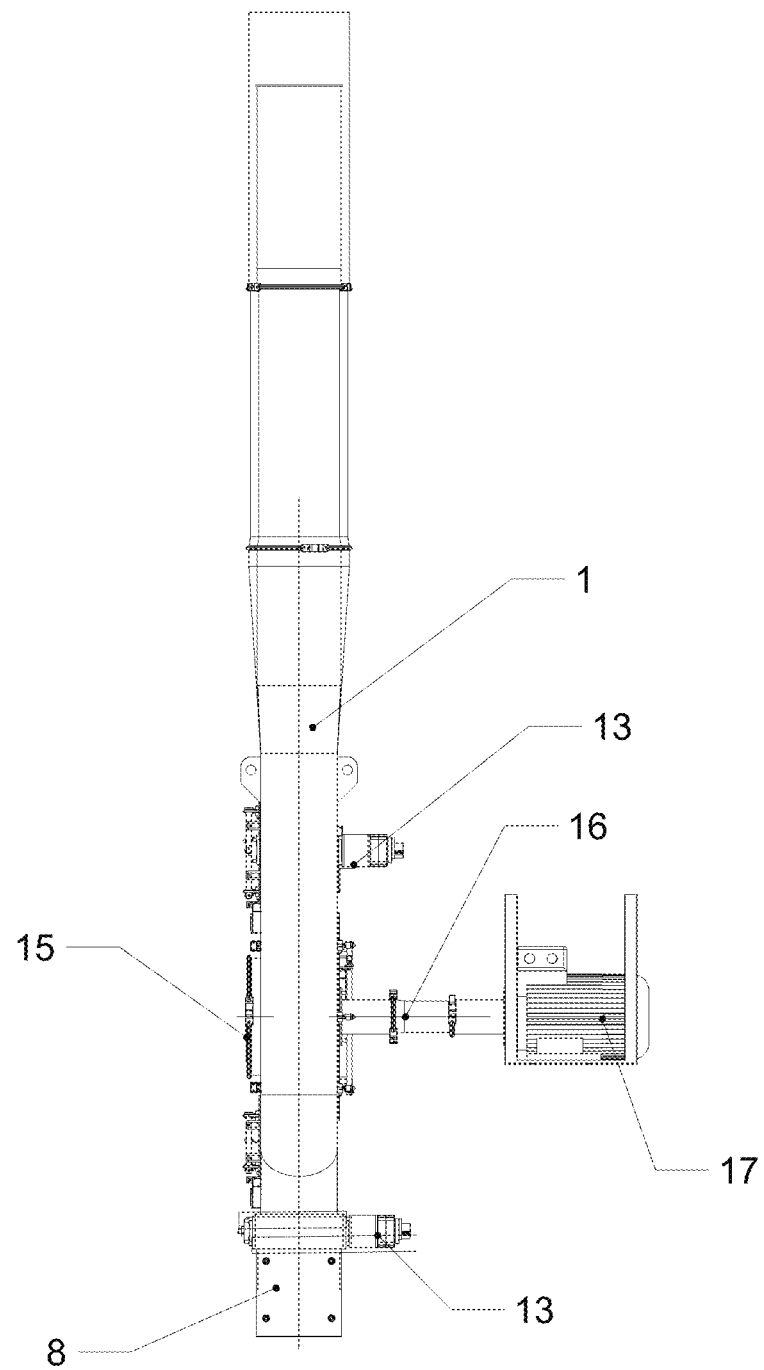
FIG. 3 is a side view of the present invention.
Figure 4:
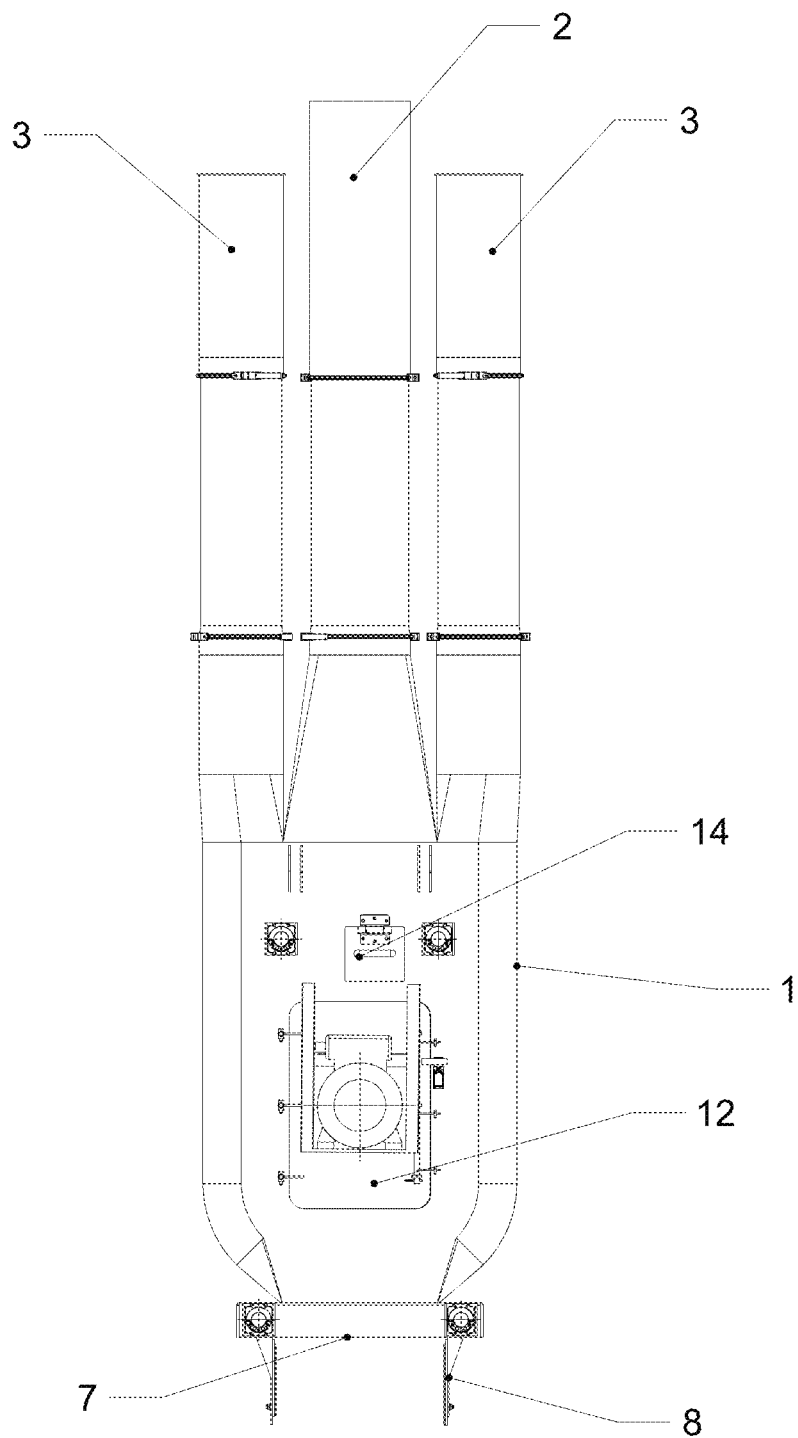
FIG. 4 is a front view of the present invention.

The technical scheme of the present invention is further described below with reference to the drawings.

As shown in FIGS. 1, 2, 3 and 4, the clean pneumatic conveying shield disclosed herein comprises a shield body 1, an outlet pipeline 2, inlet pipelines 3, splitter plates 4, upper partition plates 5, lower partition plates 6, a discharge opening 7, discharge doors 8, an arc-shaped partition plate 9, a top hinged access door 10, a bottom hinged access door 11, a hinged template access door 12, rotatory executive components 13, a spring reset type sampling door 14, a clamping hoop sealing component 15, and an adjustable sealing component 16.

Figure 29:
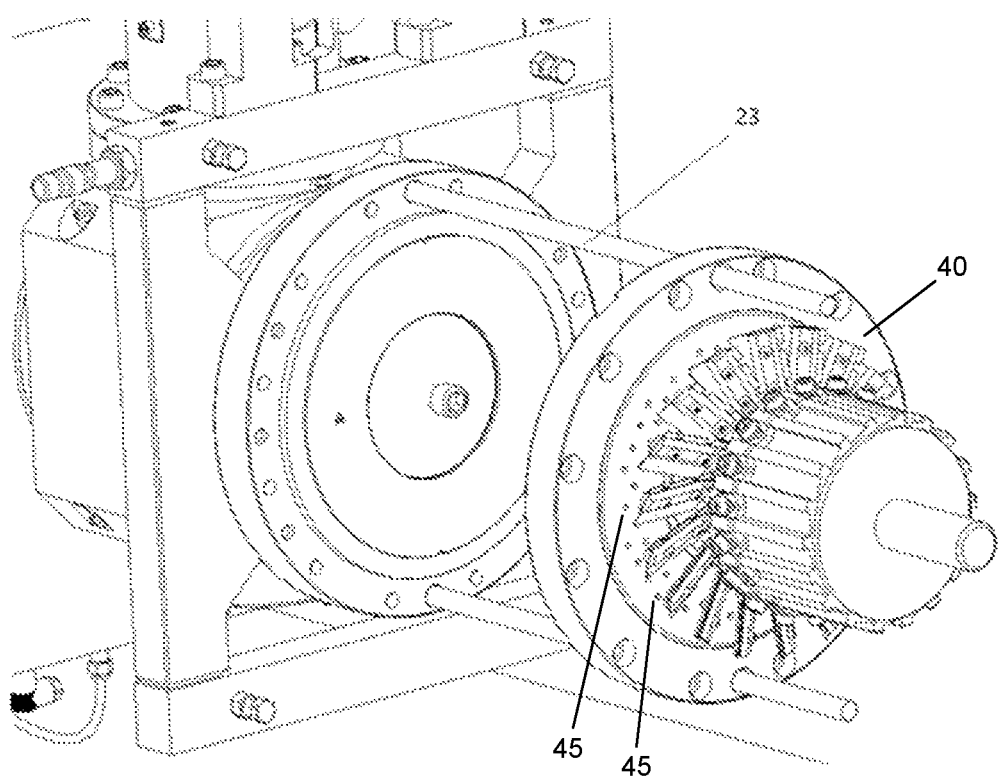
Figure 30:
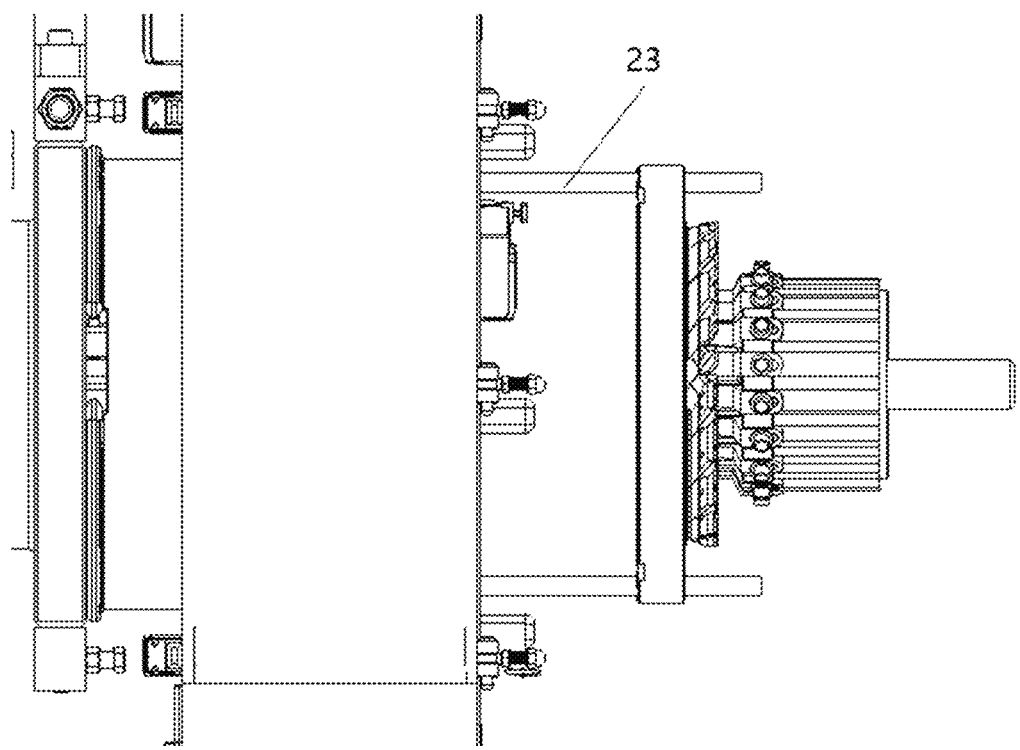

The shield body 1 is of an integrated structure, the shield body 1 is used for picking up an expanded material from an expanded material discharge port 45 (see FIG. 29) and pneumatically conveying the expanded material to the next process and is provided with a hollow closed inner cavity, one side of the shield body 1 is connected with an expanding machine 50 (see FIG. 31), the other side of the shield body is connected with a motor 17, and a top hinged access door 10 and a bottom hinged access door 11 are arranged on one side surface of the shield body 1 facing the expanding machine; a hinged template access door 12 is arranged on one side surface of the shield body 1 facing the motor; a discharge opening 7 is formed at the bottom of the shield body 1, discharge doors 8 capable of being opened and closed relatively are symmetrically arranged on the discharge opening, and rotatory executive components 13 used for opening and closing the discharge doors are arranged on the discharge doors 8. The outer surface of the shield body is a smooth plane, only three access doors and the discharge opening at the bottom are positioned on the surface, and compared with a split shield in the prior art, the shield body is more favorable to sealing; the design of the integrated shield body disclosed herein greatly reduces the number of connecting points on a sealing surface, thereby reducing leakage and contamination, and the shield body provided with access doors can be conveniently and quickly cleaned, replaced with a template 40 (see FIG. 29) and maintained.

The outlet pipeline 2 is positioned in the middle of the top of the shield body and communicated with the inner cavity of the shield, and the at least 2 inlet pipelines 3 are positioned at the top of the shield body, arranged around the outlet pipeline and communicated with the inner cavity of the shield. In the embodiment of the present invention, the 2 inlet pipelines 3 are arranged to be positioned on the left and right sides of the outlet pipeline 2, respectively. The 2 inlet pipelines disclosed herein introduce the treated air from the two sides of the shield body and converge at the bottom of the shield to form an airflow, the airflow then flows upwards through an expanded material discharge port, and then an expanded material enters the airflow to be mixed with the air; two airflows in the shield body are converged at the bottom of the shield, which allows two air inlets to be converted into a single air outlet.

Figure 5:
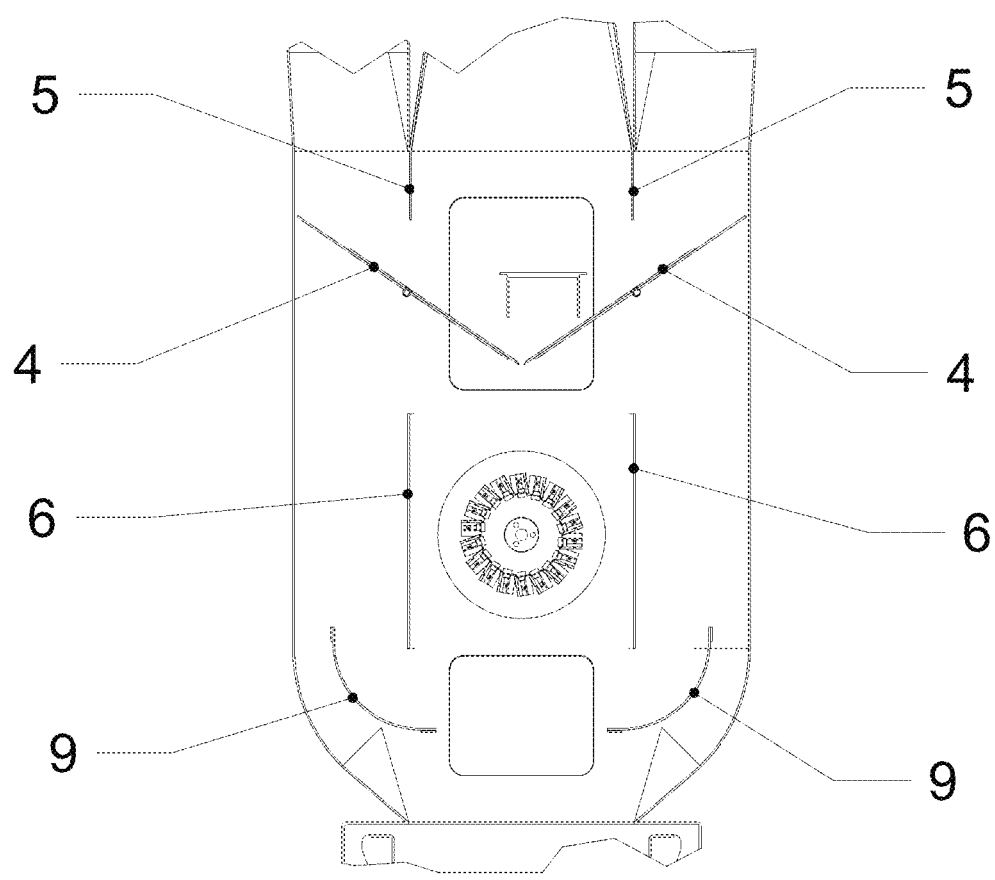
FIG. 5 is a schematic diagram of the inner cavity of the shield body according to the present invention.
Figure 7:
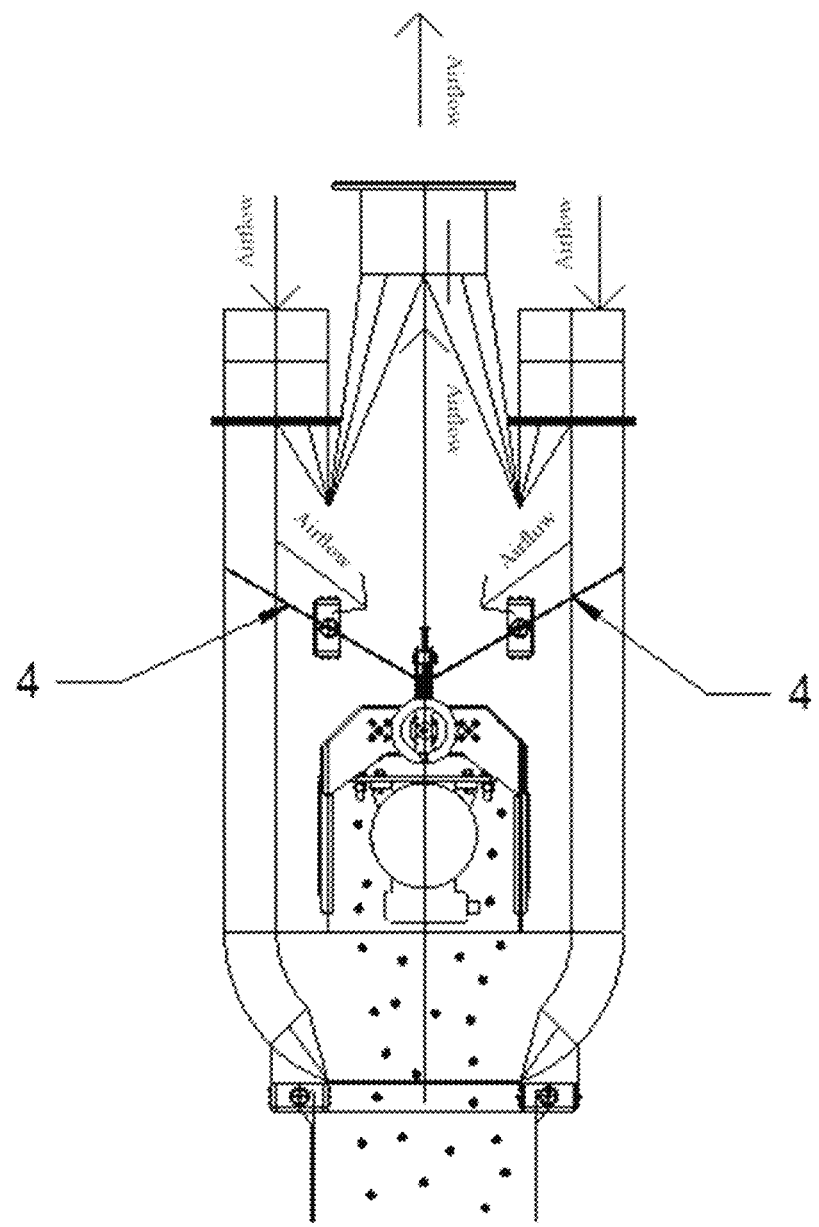
FIG. 7 is a schematic diagram of a splitting mode according to the present invention.
Figure 8:
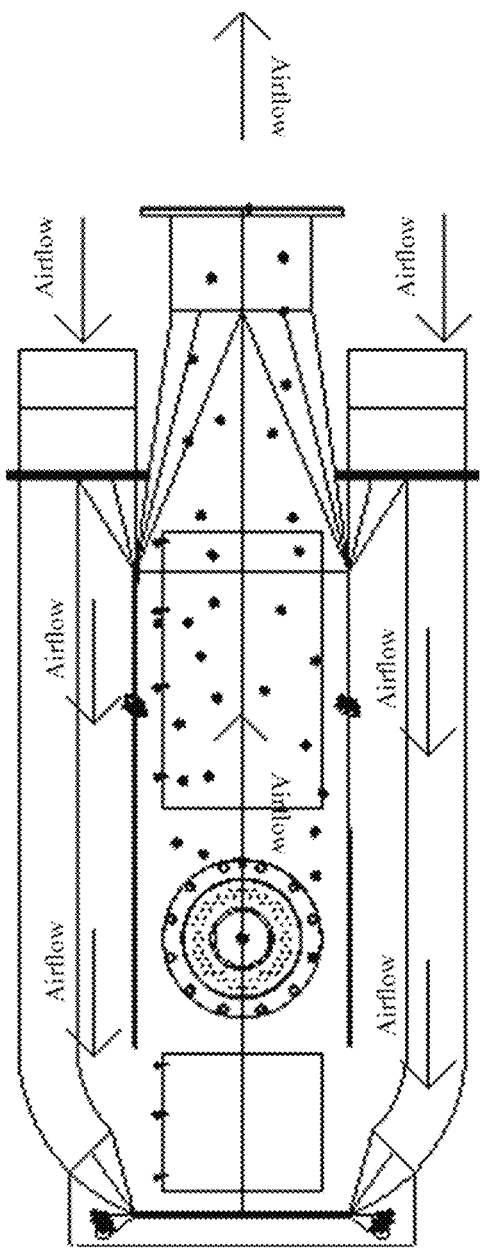
FIG. 8 is a schematic diagram of a normal running model according to the present invention.

As shown in FIG. 5, the splitter plates 4 are positioned in the shield body 1, the number of splitter plates corresponds to the number of inlet pipelines one to one; each splitter plate is arranged corresponding to each inlet pipeline, and the splitter plates are connected to the shield body through the rotatory executive components and can rotate in the shield body. An upper partition plate 5 is correspondingly arranged above each splitter plate 4, a lower partition plate 6 is correspondingly arranged below each splitter plate 4, and an arc-shaped partition plate 9 is arranged at the lower part of the inner cavity of the shield body. As shown in FIGS. 7 and 8, FIG. 7 shows a splitting mode where the airflow forms a short circuit directly above a mold of the expanding machine and then flows away, and at the same time, the material is discharged from the bottom of the shield; FIG. 8 shows the shield in a normal running mode where splitter blades are in a vertical state, so that the airflows enter the bottom from the air inlets on the two sides and converge, and then the converged airflow flows upwards through the expanded material discharge port, and meanwhile, the material enters the airflow and flows to the air outlet to enter the next process. When each splitter plate is rotated to be connected with the upper partition plate and the lower partition plate corresponding thereto, a conveying airflow channel communicated with the inlet pipelines and the outlet pipeline and capable of carrying and conveying the expanded material through the expanded material discharge port is formed in the shield body in a dividing manner; when each splitter plate is rotated until all the splitter plates are intersected, a short-circuit airflow channel communicated with the inlet pipelines and the outlet pipeline and bypassing the expanded material discharge port is formed in the shield body in a dividing manner. The splitter plates disclosed herein can change internal airflow channels to split airflows, which can reduce the connections required by an independent steering valve, and meanwhile, access doors can be provided for dismounting module and blades; moreover, when the splitter plates are rotated to form short-circuit airflow channels, the discharge doors at the bottom of the shield body can be opened at the same time, which allows the shield to be converted into a feeding mode, the airflow forms a short circuit and directly bypasses an expanded material discharge port, and meanwhile, the function of directly discharging at the lower part of the shield is realized. That is to say, when an operator needs to make a material bypass and leave the next process, the splitter plates can change the internal cavity channels to make the airflow form a short circuit and directly flow away from the upper part of the shield by bypassing the expanded material discharge port, and the discharge plate at the bottom is opened in the 'feeding' mode to make the expanded material directly discharged into the pipeline at the lower part from the bottom of the shield by gravity.

Figure 10:
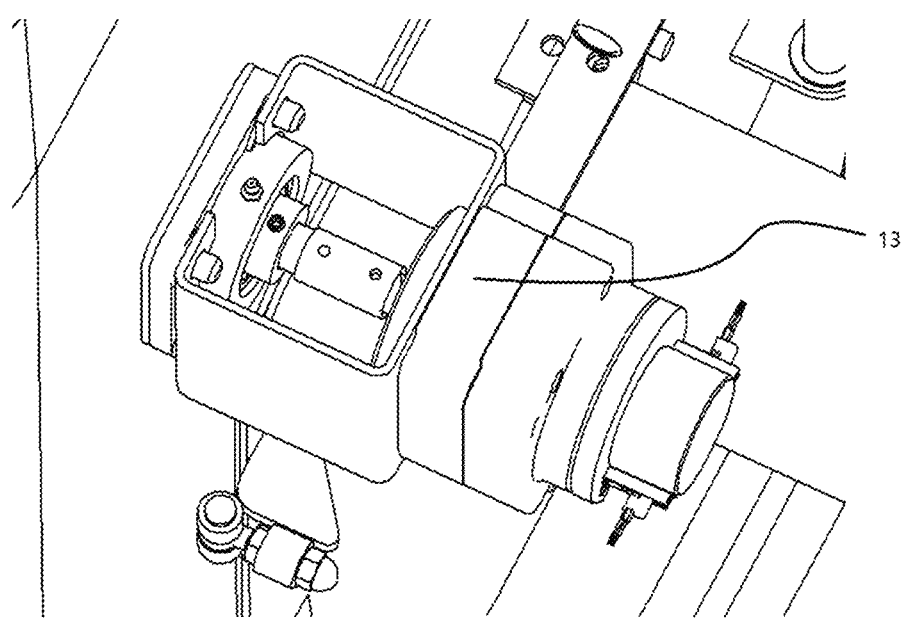
FIG. 10 is a schematic diagram of the mounting of the rotatory executive component according to the present invention.
Figure 11:
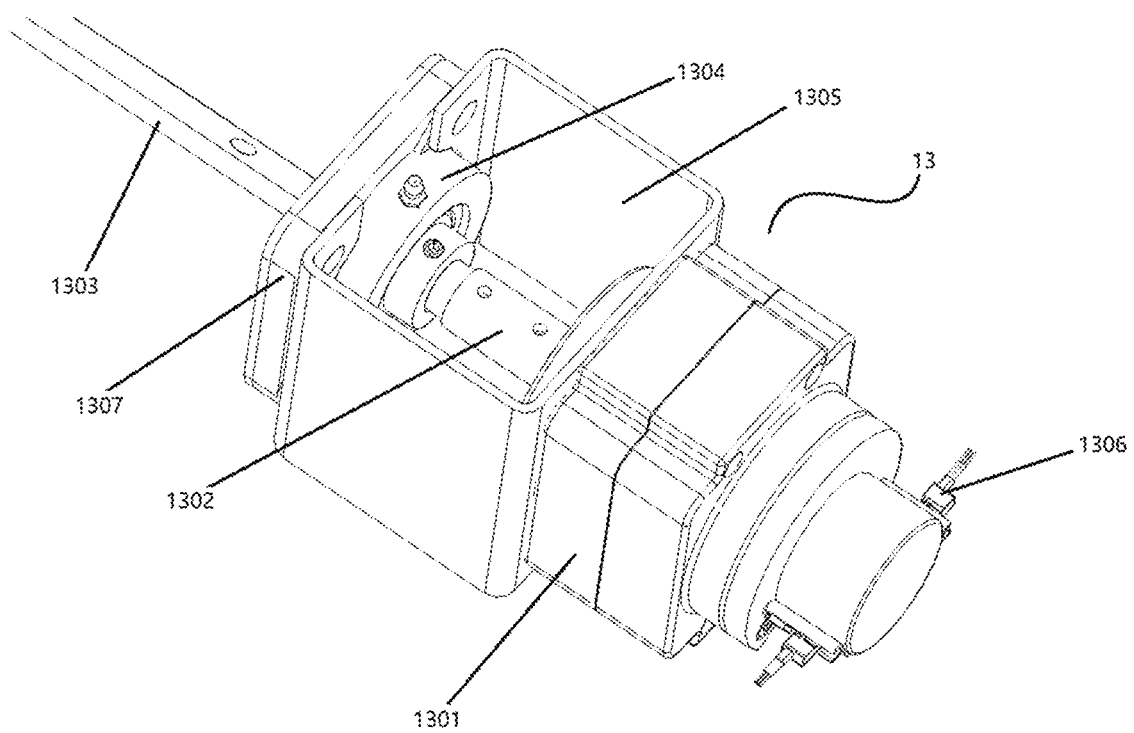
FIG. 11 is a schematic diagram of the structure of the rotatory executive component according to the present invention.
Figure 12:
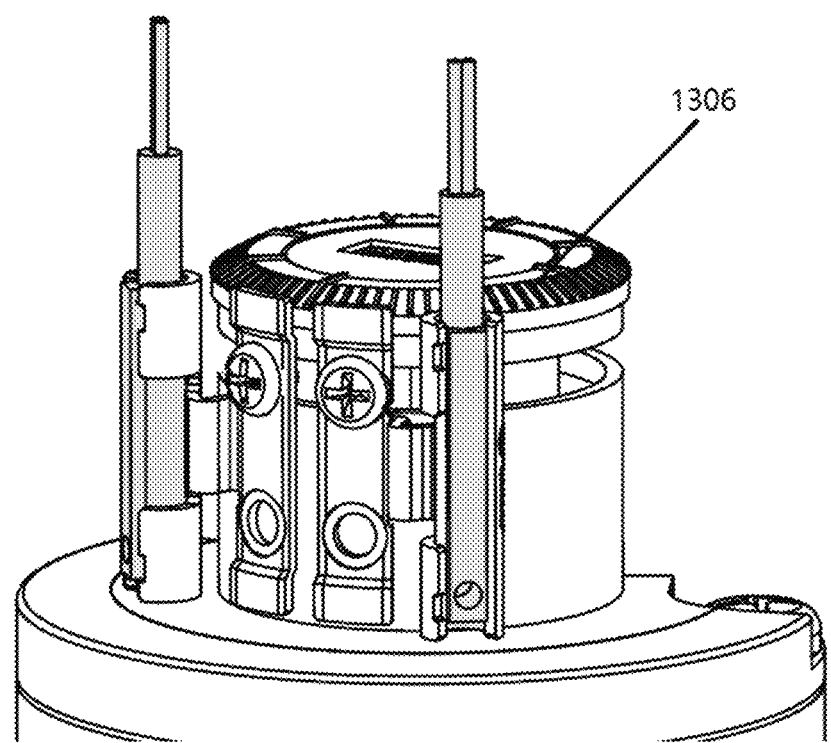
FIG. 12 is a schematic diagram of the structure of the magnetic switch of the rotatory executive component according to the present invention.
Figure 13:
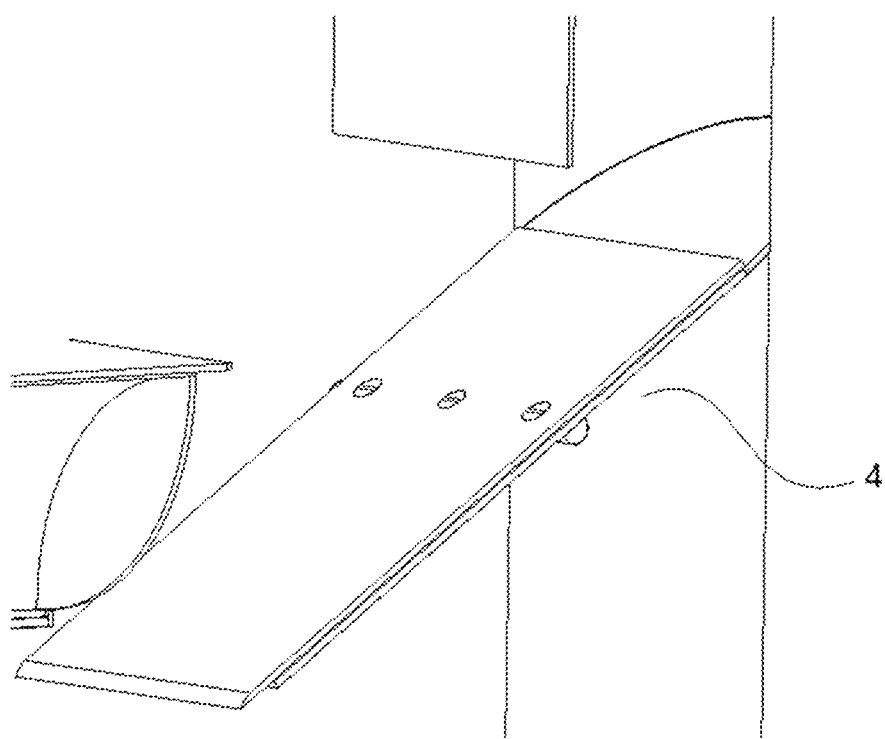
FIG. 13 is a schematic diagram of the structure of the splitter plate according to the present invention.
Figure 14:
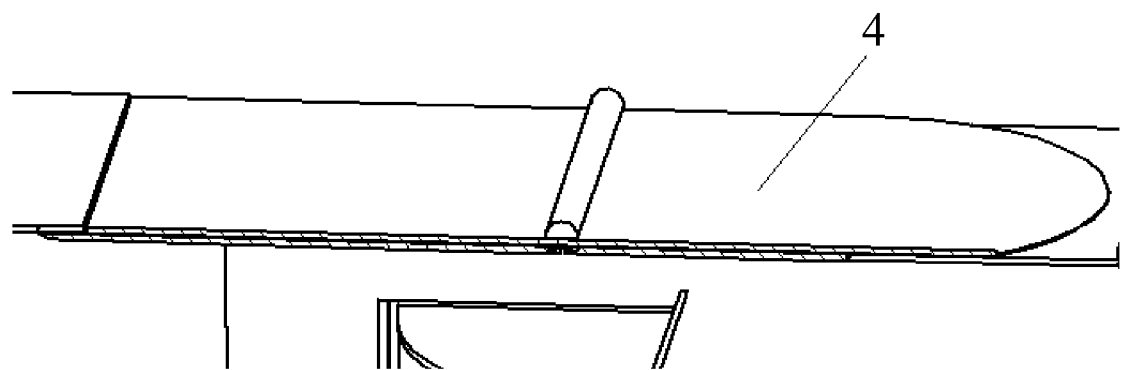
FIG. 14 is a schematic diagram of the structure of the splitter plate in a perpendicular state according to the present invention.
Figure 15:
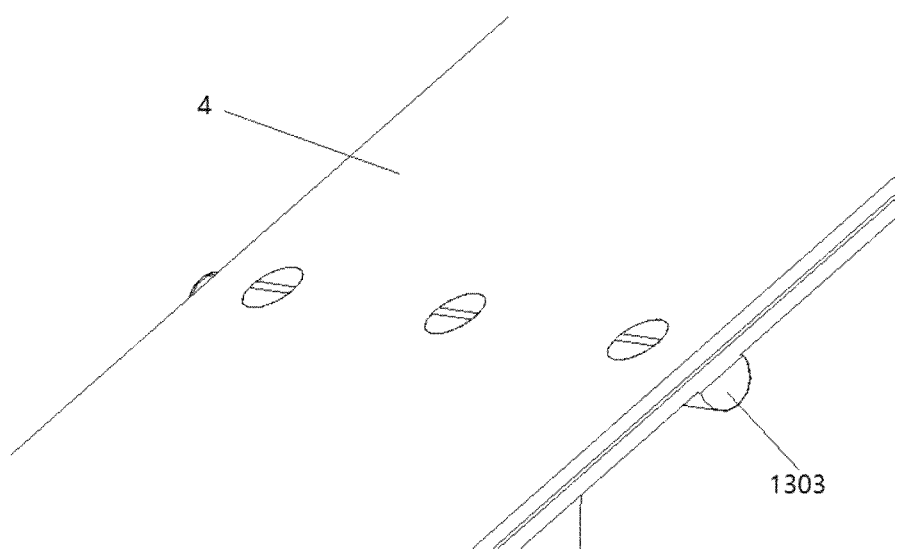
FIG. 15 is a schematic diagram of the connection of the splitter plate according to the present invention.
Figure 16:
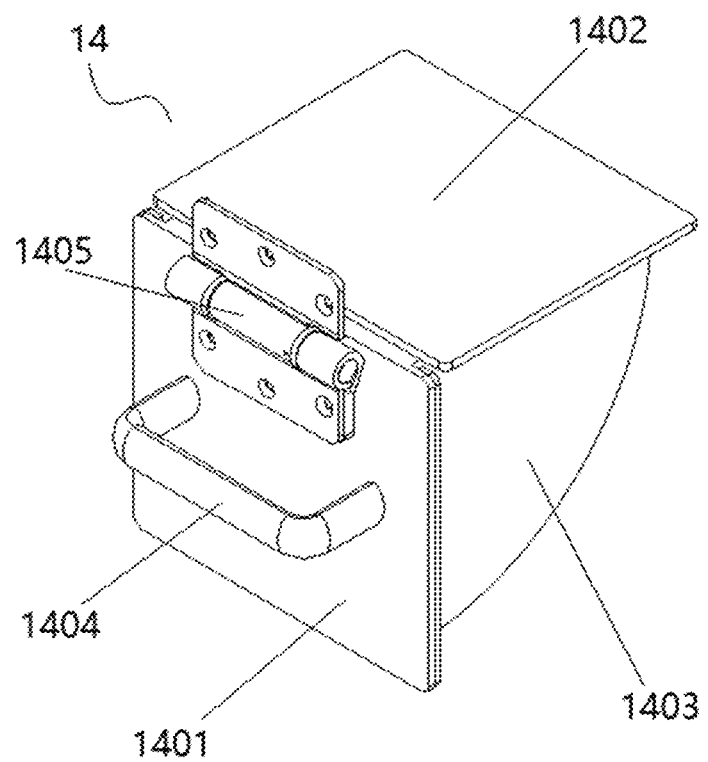
FIG. 16 is a schematic diagram of the structure of the spring reset type sampling door according to the present invention.

As shown in FIGS. 10, 11 and 12, the rotatory executive components 13 can drive the splitter plates to rotate, and rotatory executive components 13 are fixed on the outer wall of the shield body 1 through a backing plate 1307. The rotatory executive component 13 comprises a swing cylinder 1301, a splitter plate rotation shaft 1303 connecting with an output shaft of the swing cylinder through a coupling 1302, a mounting bracket 1305 fixing to the shield body through a bearing 1304 and used for fixing the swing cylinder, and magnetic switches 1306 positioned on the swing cylinder and used for changing a rotation angle of the swing cylinder. The mounting bracket 1305 is a C-shaped structure, and the swing cylinder is mounted on the mounting bracket. As shown in FIGS. 13, 14 and 15, the splitter plate 4 disclosed herein can be assembled by stacking 2 plates to form a step structure; a splitter plate rotation shaft is positioned at the central symmetry axis of the splitter plate, when in the splitting mode, the splitter plate is shown in FIG. 13, and when in the normal production mode, the splitter plate is shown in FIG. 14; the step structure formed by the two plates of the splitter plate is matched with the upper partition plate and the lower partition plate both in the vertical state, and three flat head rivets fix the splitter plate to the splitter plate rotation shaft. In the present invention, a rotation angle of the swing cylinder can be changed by adjusting the magnetic switches; when the position of each magnetic switch needs to be changed, only a cross-shaped round-head screw shown in FIG. 12 needs to be loosened, and the cross-shaped round-head screw is screwed after the position is determined; the orientation of the magnetic switch in FIG. 12 is upward, which is an exemplary orientation that may be changed in practice.

Figure 6:
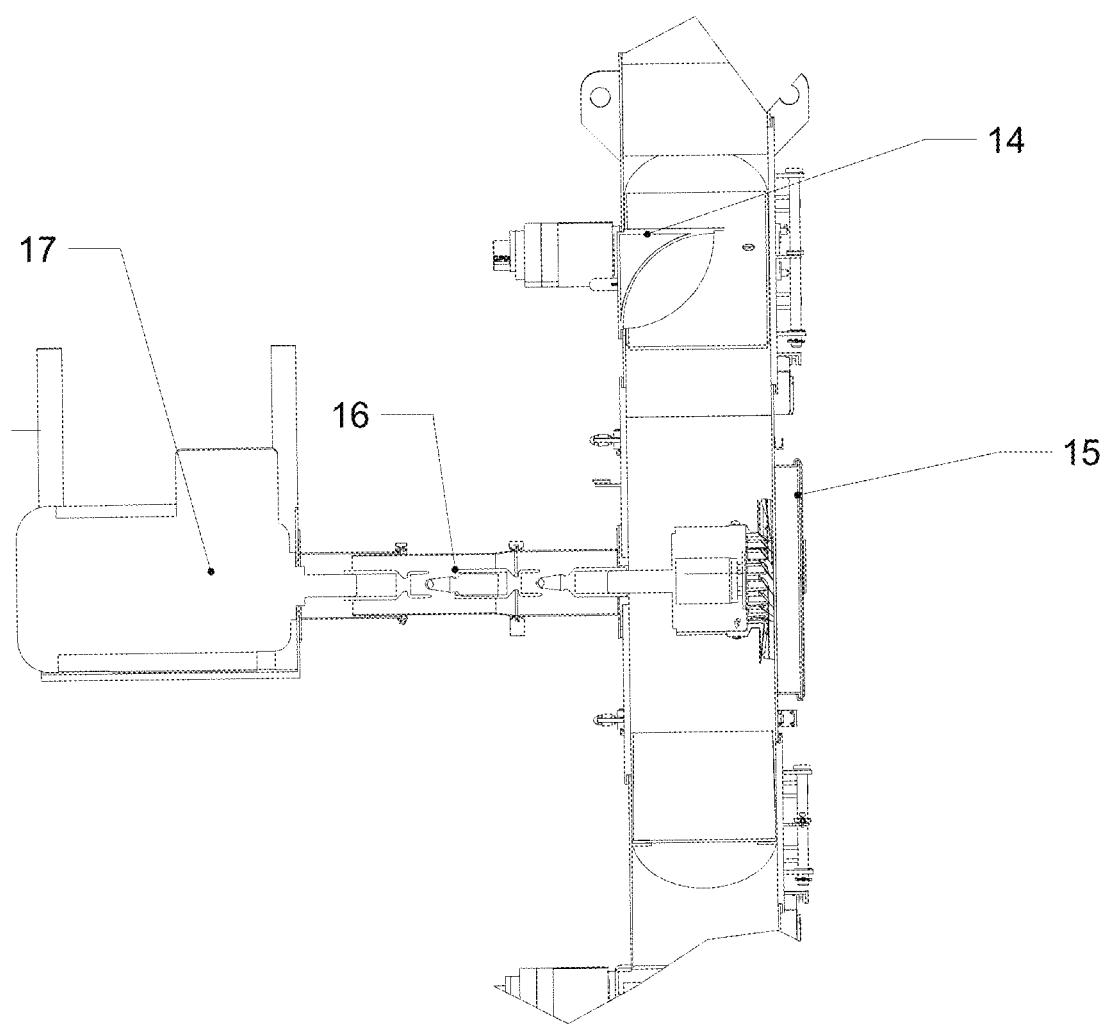
FIG. 6 is a schematic diagram of the connection between the shield body and the motor according to the present invention.
Figure 9:
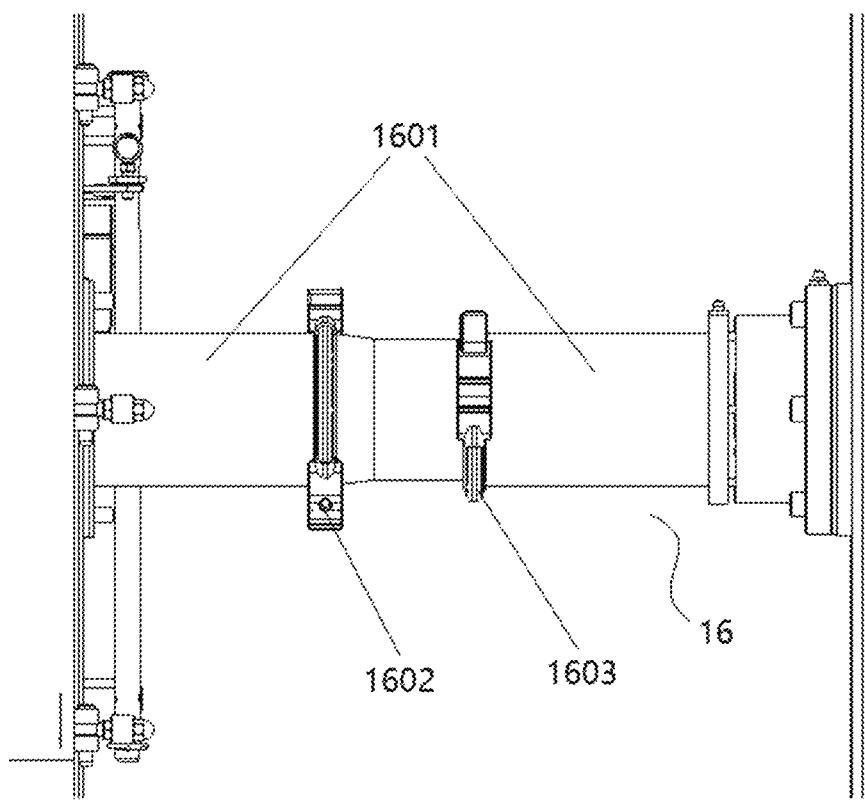
FIG. 9 is a schematic diagram of the structure of the adjustable sealing component according to the present invention.
Figure 31:
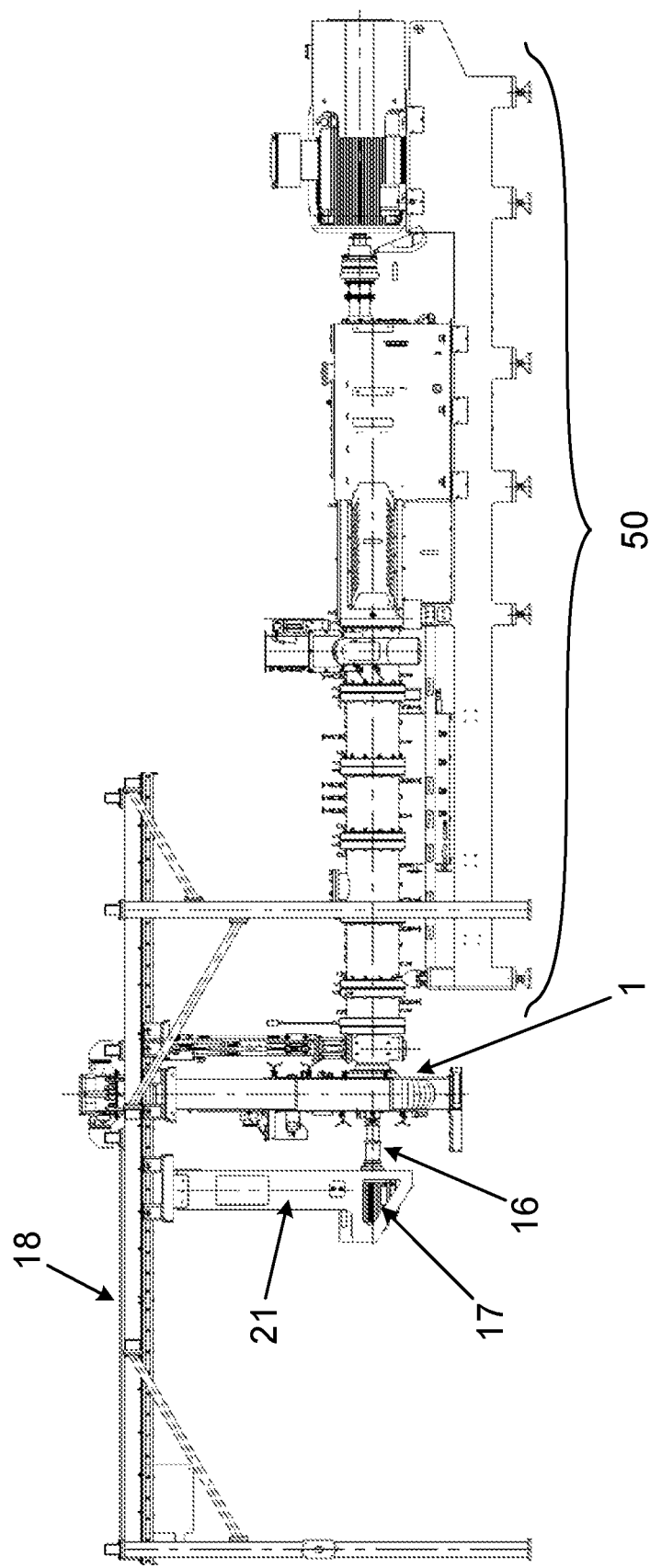
FIG. 31 is a schematic diagram of the structure of the mold replacement system being assembled to the expanding machine according to the present invention.

As shown in FIGS. 6, 9 and 31, the shield body 1 disclosed herein is connected with the expanding machine 50 (see FIG. 31) through the clamping hoop sealing component 15, the expanded material discharge port 45 (see FIG. 29) is positioned in the shield body, the shield body 1 is connected with the motor 17 through the adjustable sealing component 16, the adjustable sealing component 16 comprises connecting pipes 1601 of different diameters connecting with the shield body and the motor respectively and telescoping each other, and two ends of the outer walls of the two connecting pipes are fixed through a pull ring type clamping hoop 1602 and a pull ring type quick clamping hoop 1603 respectively. The pull ring type clamping hoop 1602 and the pull ring type quick clamping hoop 1603 may preferably be made of clamping hoop products from Jacob Tubing L.P, a sealing ring of the pull ring type clamping hoop 1602 is a U-shaped sealing ring, and a sealing ring of the pull ring type quick clamping hoop 1603 is an O-shaped sealing ring. The adjustable quick clamping hoops are used on the motor side and the expanding machine side of the shield to realize quick butting and sealing connection; this design can ensure that the shield can be connected with expanding machines with different models and different designs; the quick clamping hoop connection can be adjusted to adapt to expanding machines and motors with different sizes, and meanwhile, the sealing of particle sealing grade is provided between interfaces of devices.

Figure 17:
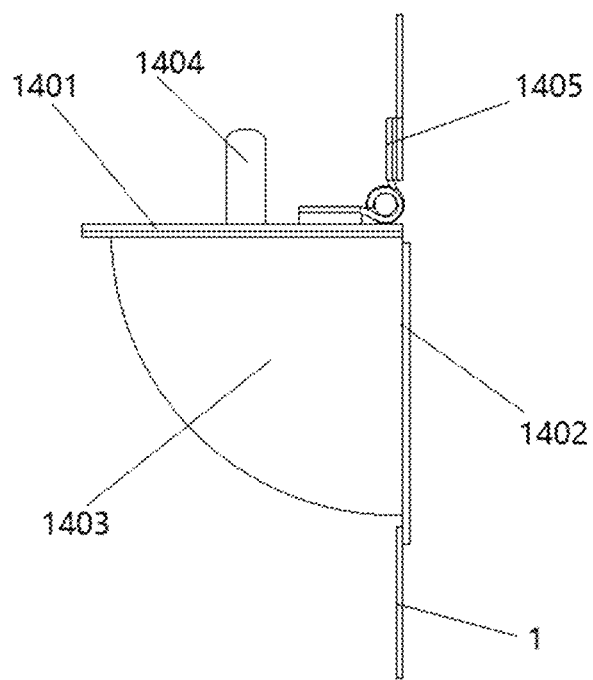
FIG. 17 is a schematic diagram of the structure of the spring reset type sampling door in an opened state according to the present invention.
Figure 18:
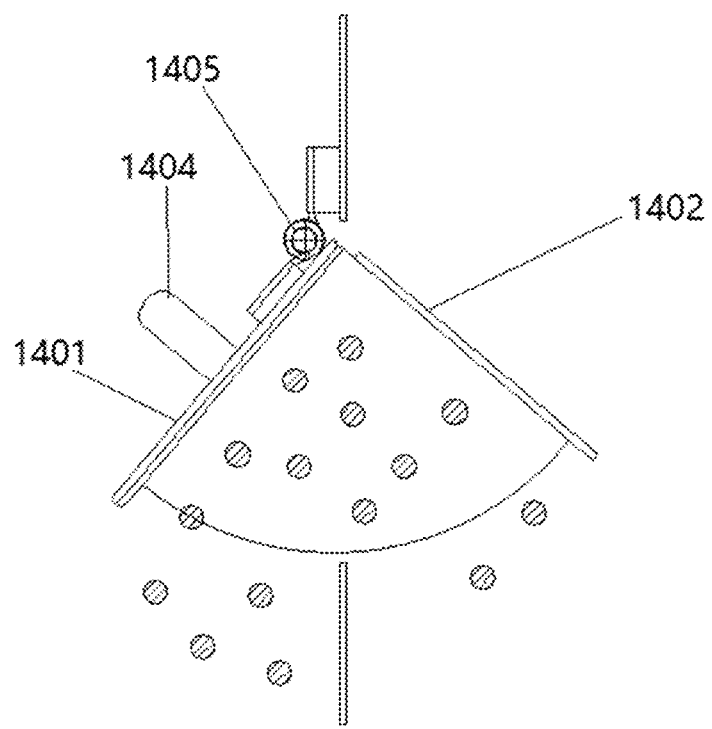
FIG. 18 is a schematic diagram of the structure of the spring reset type sampling door in a sampling state according to the present invention.
Figure 19:
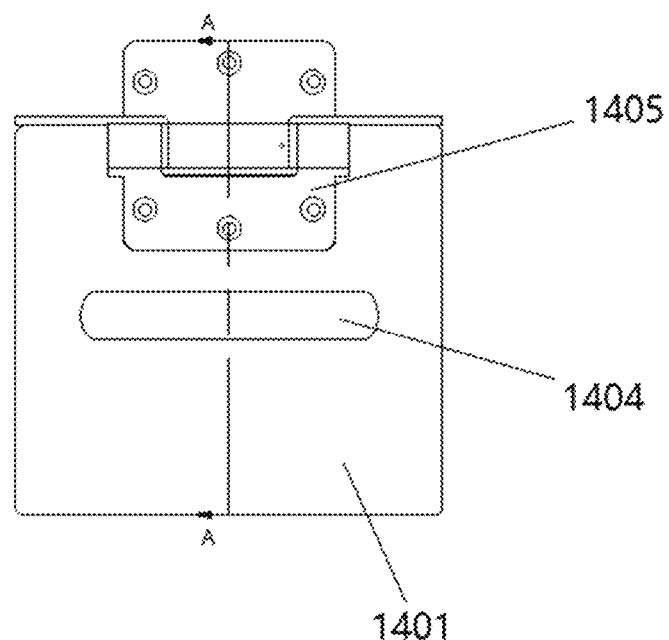
FIG. 19 is a front view of the spring reset type sampling door according to the present invention.
Figure 20:
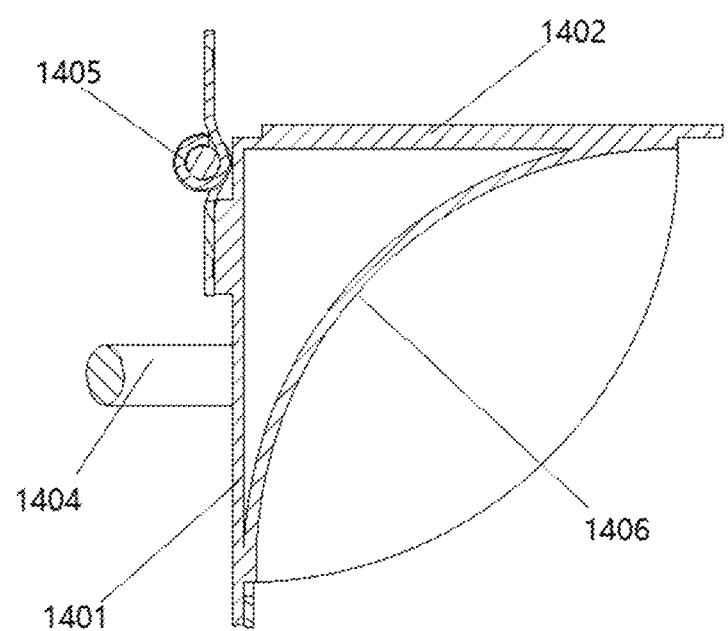
FIG. 20 is a sectional view of the spring reset type sampling door according to the present invention.
Figure 21:
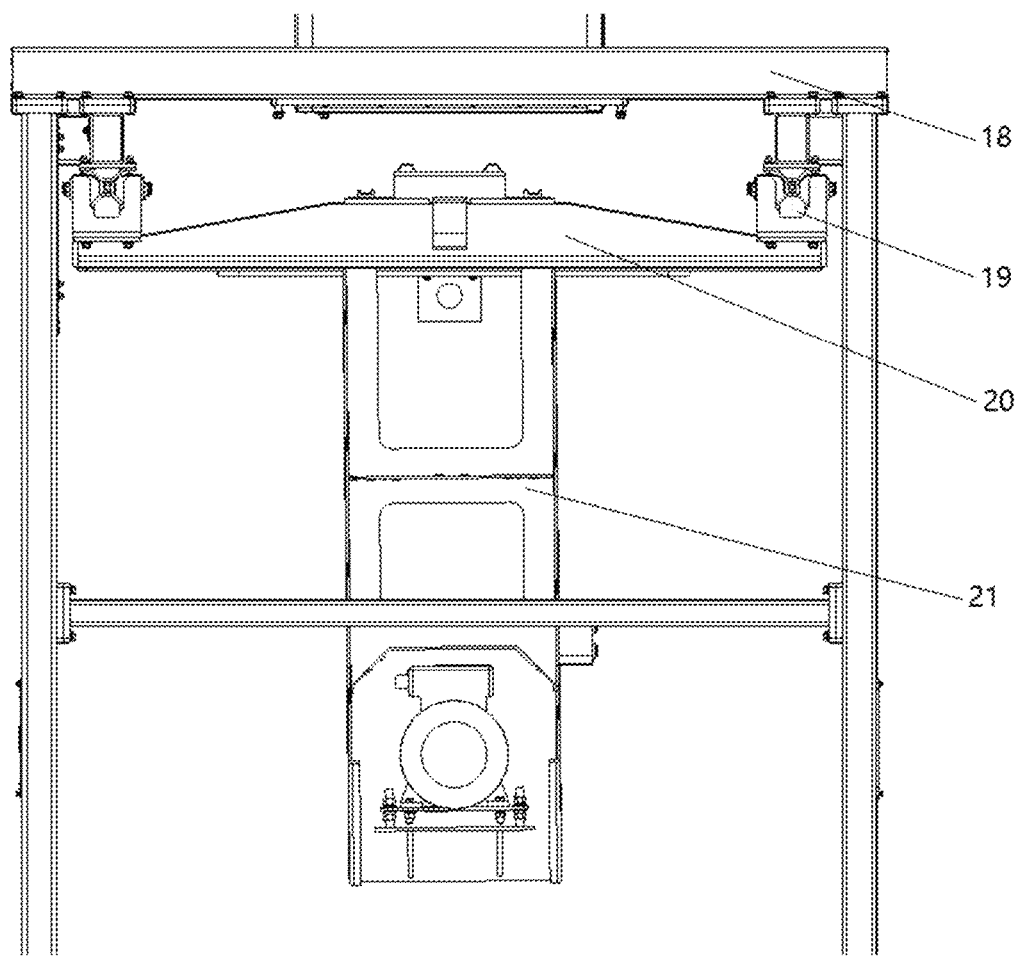
FIG. 21 is a schematic diagram of the structure of the mold replacement system for the expanding machine according to the present invention.
Figure 22:
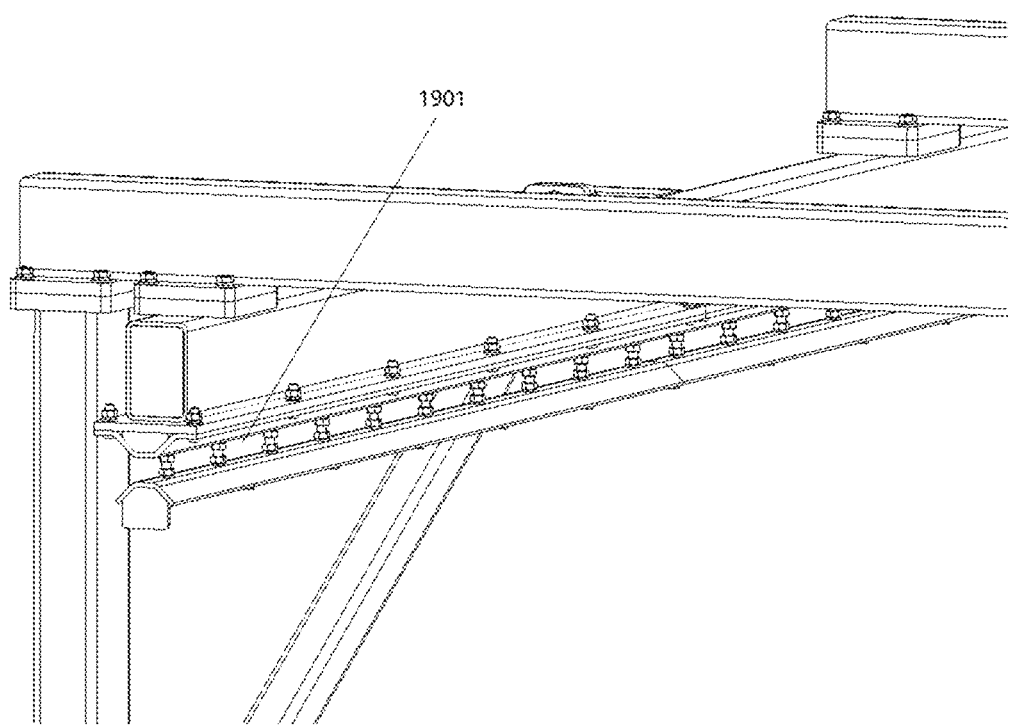
FIG. 22 is a schematic diagram of the structure of the sliding rails according to the present invention.
Figure 23:
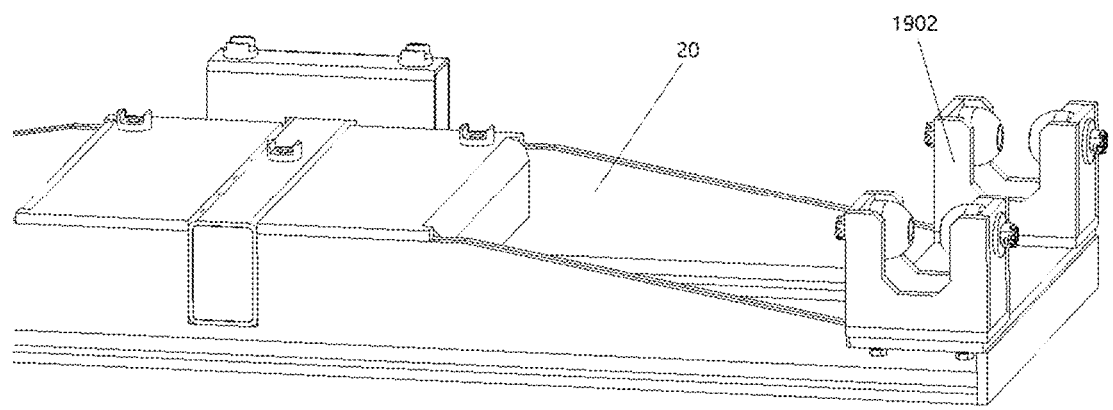
FIG. 23 is a schematic diagram of the structure of the motor sliding frame according to the present invention.
Figure 24:
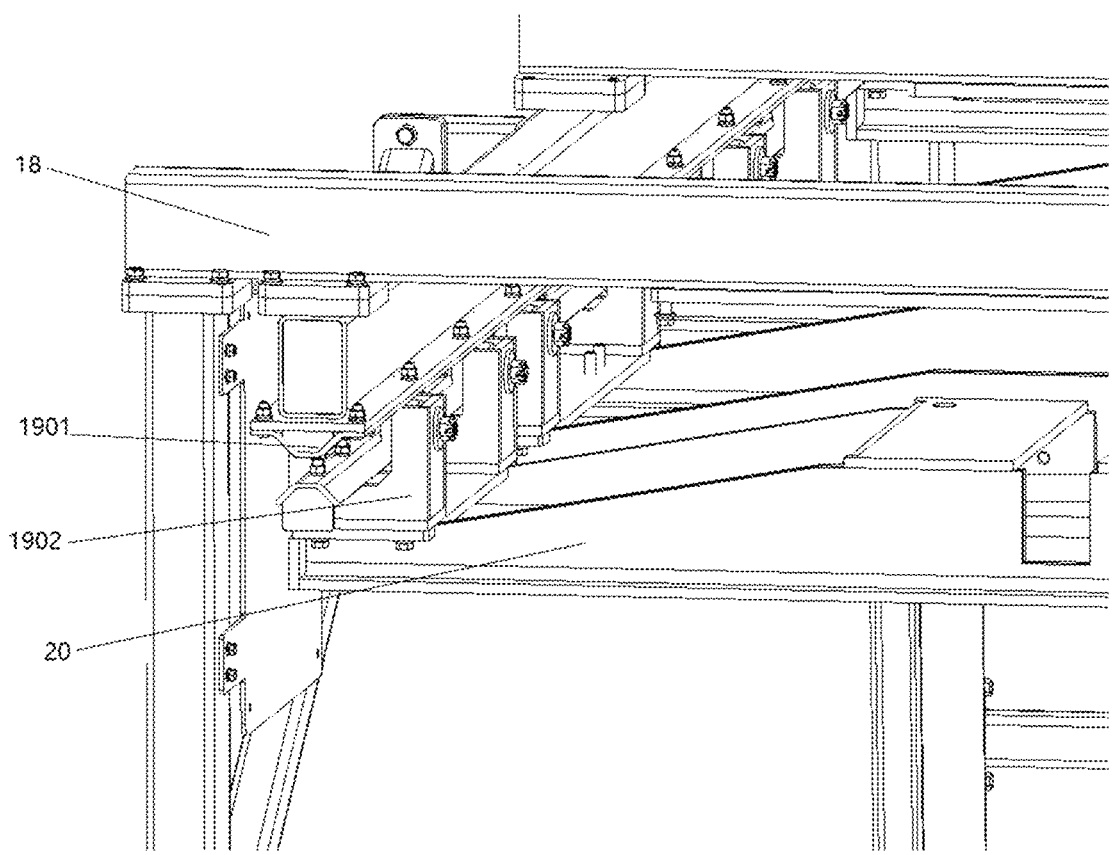
FIG. 24 is a schematic diagram of the connection between the motor sliding frames and the sliding rails according to the present invention.
Figure 25:
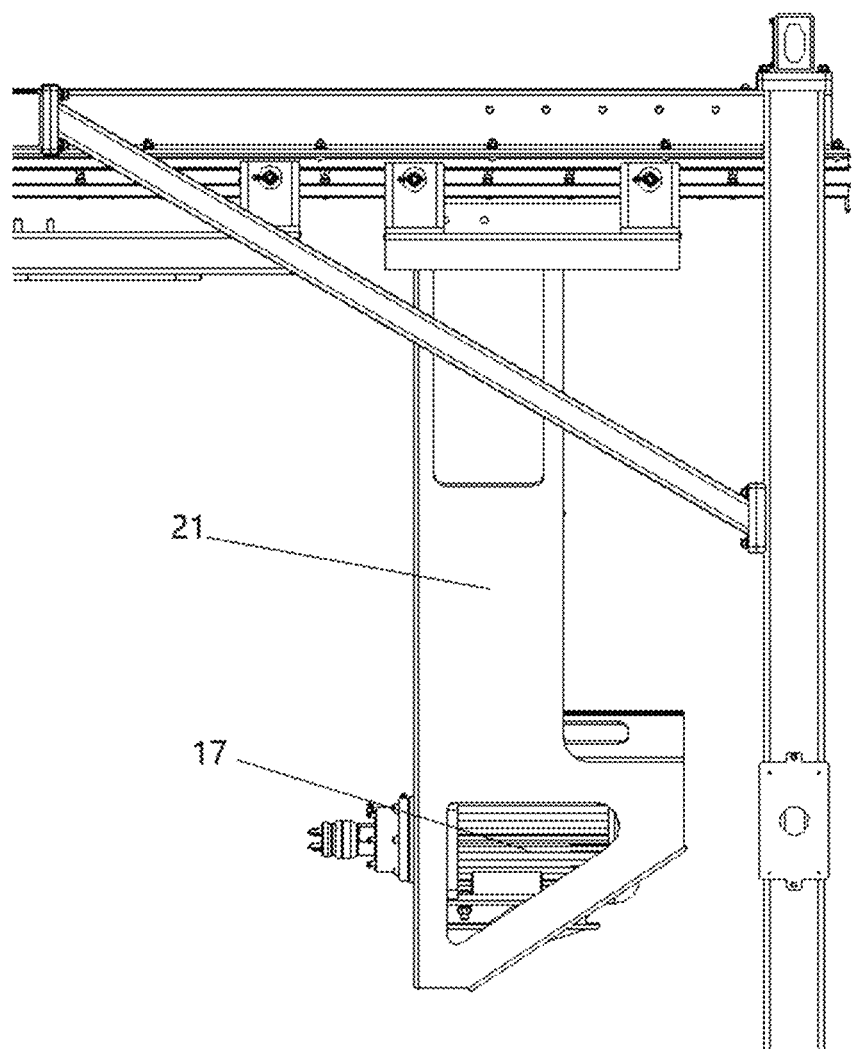
FIG. 25 is a schematic diagram of the structure of the motor suspension bracket according to the present invention.
Figure 26:
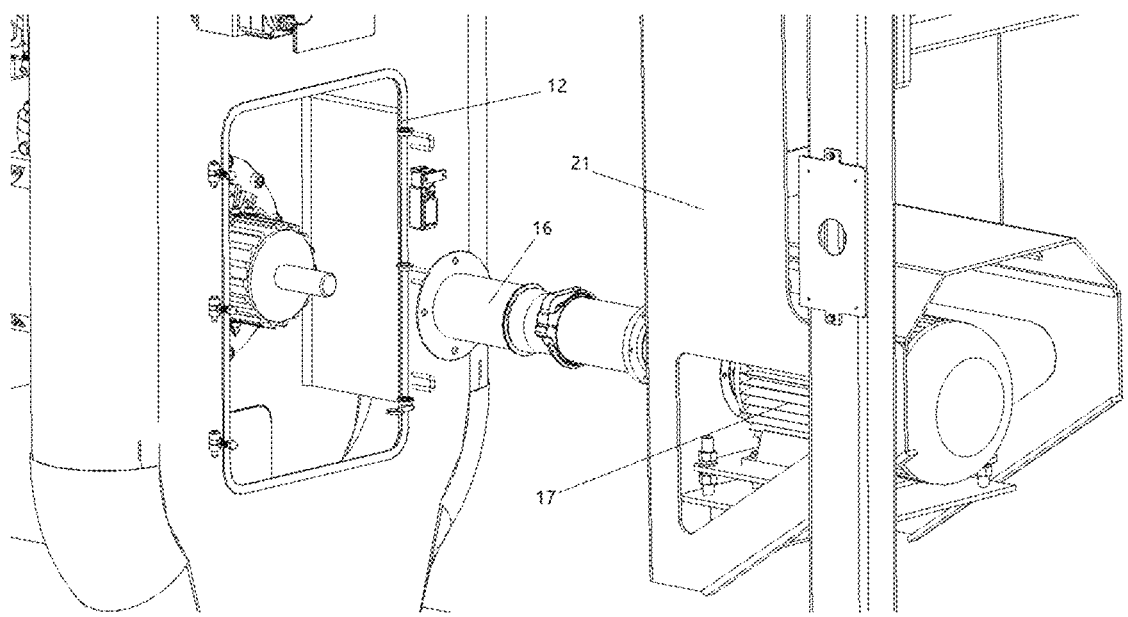
FIGS. 26-30 are flowcharts of the replacement process of the mold replacement system for the expanding machine according to the present invention.
Figure 27:
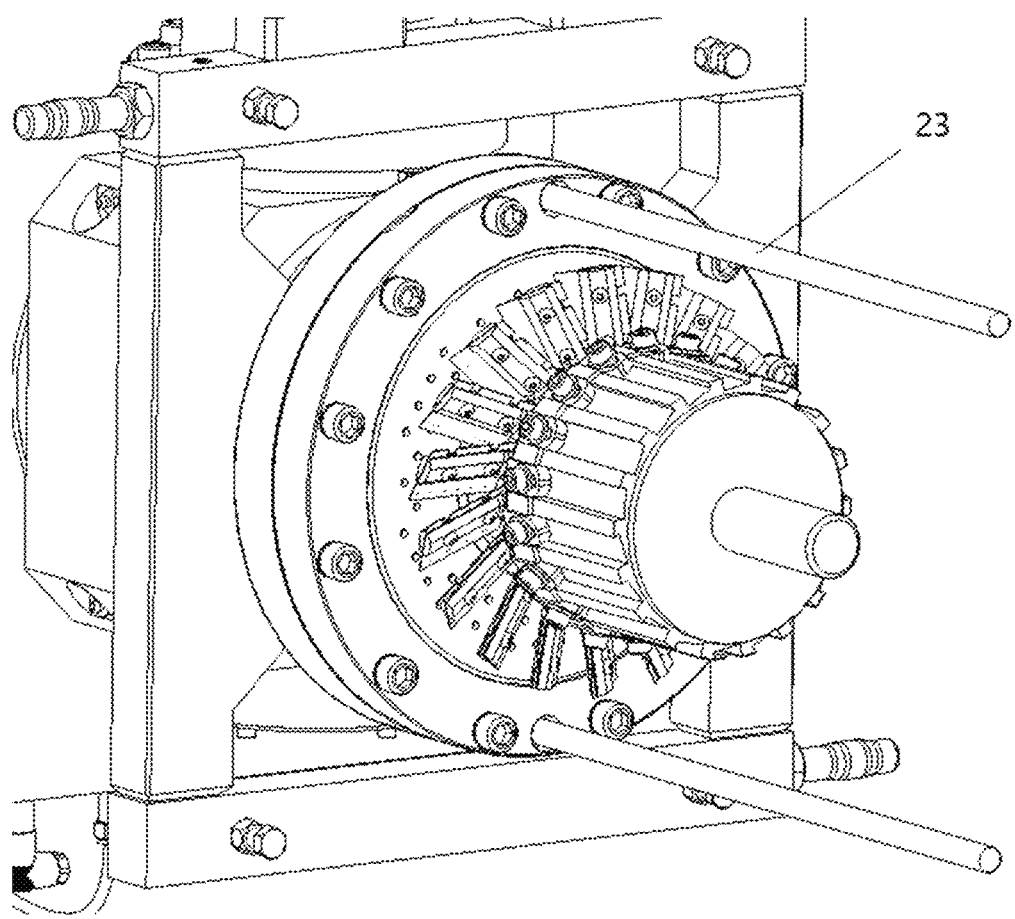
Figure 28:
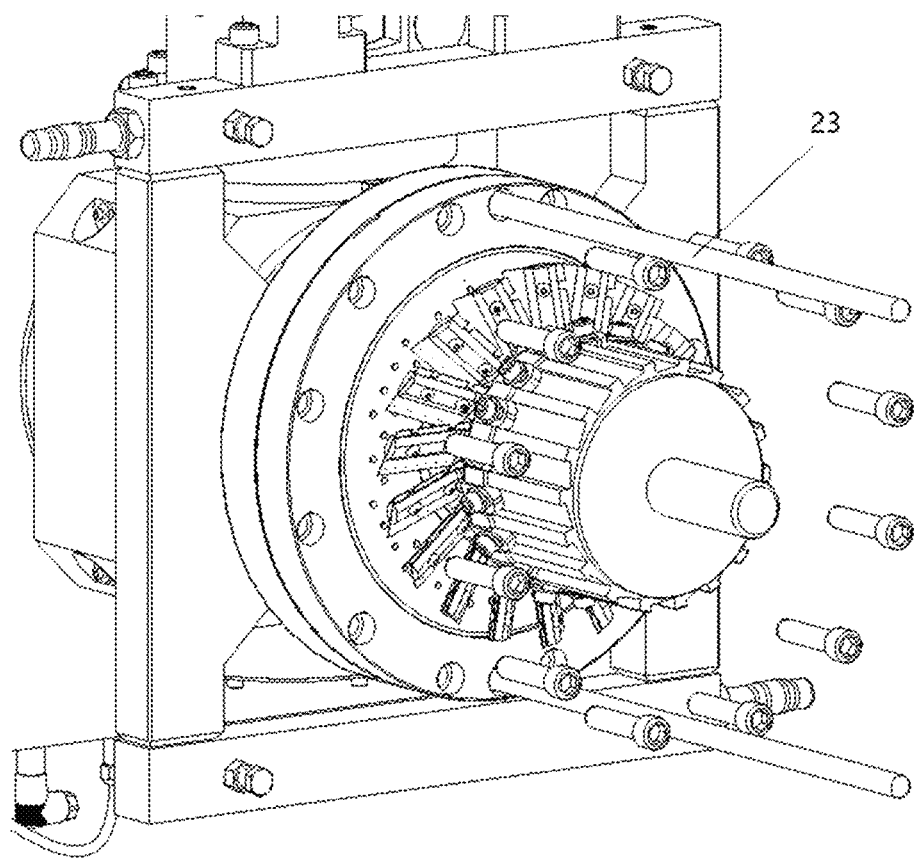

As shown in FIGS. 16, 17, 18, 19 and 20, the spring reset type sampling door 14 is arranged on one side surface of the shield body 1 facing the motor, and the spring reset type sampling door 14 comprises a front door 1401, a top plate 1402, two side plates 1403 used for connecting the front door and the top plate, a handle 1404 positioned on the front door, a spring reset hinge 1405 positioned on the front door and the shield body, and an arc plate 1406 positioned in a space surrounded by the front door, the top plate and the side plates; when not sampling, the sampling door is as shown in FIG. 17; when sampling, the sampling door is as shown in FIG. 18; after sampling, the spring is reset to make the sampling door back to the state shown in FIG. 17. The spring reset type sampling door disclosed herein can finish sampling when the system runs, the sampling door is pushed to the interior of the shield during sampling, and the arc plate is designed to guide a small part of products to the exterior of the shield and enter a sample cup of an operator for quality detection; the door can be quickly closed along with the release of a spring in the spring reset hinge, so that the machine downtime and the leakage of a large amount of products are avoided; the spring set type sampling door enables the operator to conveniently touch products during operation for detection as required instead of adopting a conventional method to discharge the materials to the ground and then sample the materials. As a result, the loss of products and the required cleaning work can be greatly reduced.

As shown in FIGS. 21, 22, 23, 24 and 25, the mold replacement system for the expanding machine based on the clean pneumatic conveying shield disclosed herein comprises an overall support 18, motor sliding frames 20 connected with the overall support through sliding rails 19, and a motor suspension bracket 21 fixedly connected with the motor sliding frames and used for placing and fixing the motor, wherein the sliding rails 19 comprise sliding tracks 1901 and rollers 1902 mutually adapted, and the rollers can slide on the sliding tracks and are fixed on the motor sliding frames. Due to the narrow thickness of the shield main body and the large door on one side of the motor, the expanding mold can be replaced under the condition that the connection among the shield, the air inlets, the pneumatic conveying pipelines and the expanding machine is not cut off, and the motor and the shield are quickly and easily disconnected due to the design of the adjustable sealing component, and meanwhile, the mold replacement system for the expanding machine can move an motor driving device assembly out of the area so as to be completely maintained; when the template is replaced, the connection between the expanded pneumatic conveying cover and the expanding machine or the pipelines does not need to be cut off, and the template can be replaced only through can be gone on through the access door of motor side.

As shown in FIGS. 26-30, the replacement method for the mold replacement system for the expanding machine disclosed herein comprises: opening the pull ring type clamping hoop and the pull ring type quick clamping hoop, driving the motor to slide in a direction away from a template 40 through the sliding rails, the motor sliding frame and the motor suspension bracket, and then opening a hinged template access door; and inserting two guide rails 23 into reserved screw holes of the template 40, dismounting screws for fixing the template, sliding the template 40 and a blade set out of the shield body along the guide rails 23, and replacing the template 40 with a new template and mounting the new template into the original position when the template is positioned outside the shield body.

What is claimed is:

1. A clean pneumatic conveying shield, comprising: a shield body (1) used for picking up an expanded material from an expanded material discharge port and pneumatically conveying the expanded material to the next process and provided with a hollow closed inner cavity, an outlet pipeline (2) positioned in the middle of the top of the shield body and communicated with the inner cavity of the shield, and at least two inlet pipelines (3) positioned at the top of the shield body, arranged around the outlet pipeline and communicated with the inner cavity of the shield, wherein the shield body is provided with a splitter plate (4) corresponding to each inlet pipeline and capable of rotating, an upper partition plate (5) positioned above each splitter plate and a lower partition plate (6) positioned below each splitter plate; when each splitter plate is rotated to be connected with the upper partition plate and the lower partition plate corresponding thereto, a conveying airflow channel communicated with the inlet pipelines and the outlet pipeline and capable of carrying and conveying the expanded material through the expanded material discharge port is formed in the shield body in a dividing manner; when each splitter plate is rotated until all the splitter plates are intersected, a short-circuit airflow channel communicated with the inlet pipelines and the outlet pipeline and bypassing the expanded material discharge port is formed in the shield body in a dividing manner.

2. The clean pneumatic conveying shield according to claim 1, wherein a discharge opening (7) is formed at the bottom of the shield body (1), and discharge doors (8) capable of being opened and closed relatively are symmetrically arranged on the discharge opening.

3. The clean pneumatic conveying shield according to claim 1, wherein an arc-shaped partition plate (9) is arranged at the lower part of the inner cavity of the shield body.

4. The clean pneumatic conveying shield according to claim 1, wherein a top hinged access door (10) and a bottom hinged access door (11) are arranged on one side surface of the shield body (1) facing an expanding machine, and a hinged template access door (12) is arranged on one side surface of the shield body (1) facing a motor.

5. The clean pneumatic conveying shield according to claim 1, wherein rotatory executive components (13) capable of driving the splitter plates to rotate are connected to the splitter plates (4), and each rotatory executive component (13) comprises a swing cylinder (1301), a splitter plate rotation shaft (1303) connecting with an output shaft of the swing cylinder through a coupling (1302), a mounting bracket (1305) fixing to the shield body through a bearing (1304) and used for fixing the swing cylinder, and magnetic switches (1306) positioned on the swing cylinder and used for changing a rotation angle of the swing cylinder.

6. The clean pneumatic conveying shield according to claim 1, wherein a spring reset type sampling door (14) is arranged on one side surface of the shield body (1) facing a motor, and the spring reset type sampling door (14) comprises a front door (1401), a top plate (1402), two side plates (1403) used for connecting the front door and the top plate, a handle (1404) positioned on the front door, a spring reset hinge (1405) positioned on the front door and the shield body, and an arc plate (1406) positioned in a space surrounded by the front door, the top plate and the side plates.

7. The clean pneumatic conveying shield according to claim 1, wherein the shield body (1) is connected with an expanding machine through a clamping hoop sealing component (15), the expanded material discharge port is positioned in the shield body, and the shield body (1) is connected with a motor (17) through an adjustable sealing component (16).

8. The clean pneumatic conveying shield according to claim 7, wherein the adjustable sealing component (16) comprises connecting pipes (1601) of different diameters connecting with the shield body and the motor respectively and telescoping each other, and two ends of the outer walls of the two connecting pipes are fixed through a pull ring type clamping hoop (1602) and a pull ring type quick clamping hoop (1603) respectively.

* * * * *